(12) United States Patent
Ishii et al.

(10) Patent No.: US 10,934,399 B2
(45) Date of Patent: Mar. 2, 2021

(54) POLYMER LATEX PRODUCTION METHOD

(71) Applicant: ZEON CORPORATION, Tokyo (JP)

(72) Inventors: Hidetake Ishii, Tokyo (JP); Junji Kodemura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 249 days.

(21) Appl. No.: 16/071,997

(22) PCT Filed: Jan. 26, 2017

(86) PCT No.: PCT/JP2017/002701
§ 371 (c)(1),
(2) Date: Jul. 23, 2018

(87) PCT Pub. No.: WO2017/135144
PCT Pub. Date: Aug. 10, 2017

(65) Prior Publication Data
US 2019/0023854 A1    Jan. 24, 2019

(30) Foreign Application Priority Data

Feb. 3, 2016  (JP) .............................. JP2016-018709

(51) Int. Cl.
| | | |
|---|---|---|
| *C08J 3/07* | (2006.01) | |
| *C08L 53/02* | (2006.01) | |
| *B29C 41/00* | (2006.01) | |
| *C08J 5/02* | (2006.01) | |
| *C08F 36/08* | (2006.01) | |
| *C08C 1/075* | (2006.01) | |
| *B60C 1/00* | (2006.01) | |
| *C08F 297/04* | (2006.01) | |
| *C08F 6/20* | (2006.01) | |
| *C08J 3/05* | (2006.01) | |
| *C08K 5/098* | (2006.01) | |
| *B29C 41/14* | (2006.01) | |

(52) U.S. Cl.
CPC ............. *C08J 3/07* (2013.01); *B29C 41/00* (2013.01); *B60C 1/00* (2013.01); *C08C 1/075* (2013.01); *C08F 6/20* (2013.01); *C08F 36/08* (2013.01); *C08F 297/044* (2013.01); *C08F 297/046* (2013.01); *C08J 3/05* (2013.01); *C08J 5/02* (2013.01); *C08K 5/098* (2013.01); *C08L 53/02* (2013.01); *B29C 41/14* (2013.01); *C08J 2309/00* (2013.01); *C08J 2309/06* (2013.01); *C08J 2353/00* (2013.01)

(58) Field of Classification Search
None
See application file for complete search history.

(56) References Cited

U.S. PATENT DOCUMENTS

2009/0281211 A1 * 11/2009 Van Der Huizen ........ C08J 3/07 524/2
2015/0376322 A1 * 12/2015 Nakamura ................ C08K 5/41 524/571

FOREIGN PATENT DOCUMENTS

EP   2980127 B1 * 10/2018 ................ C08J 5/02
JP   5031821 B2    9/2012

OTHER PUBLICATIONS

Apr. 18, 2017 International Search Report issued in International Patent Application PCT/JP2017/002701.
Aug. 19, 2019 Search Report issued in European Patent Application No. 17747302.2.

* cited by examiner

*Primary Examiner* — Megan McCulley
(74) *Attorney, Agent, or Firm* — Oliff PLC

(57) ABSTRACT

A method for producing a polymer latex, including an emulsification step of emulsifying a polymer solution obtained by dissolution of synthetic polyisoprene and/or a styrene-isoprene-styrene block copolymer having a molecular weight distribution of 1.0 to 2.6 in an organic solvent, in water in the presence of a surfactant, to thereby obtain an emulsified liquid, wherein as the synthetic polyisoprene and/or styrene-isoprene-styrene block copolymer, used are/is synthetic polyisoprene and/or a styrene-isoprene-styrene block copolymer which, when dissolved in an organic solvent to thereby be formed into a polymer solution having a viscosity at a temperature of 60° C. of 20,000 cps, have/has a solid content concentration in the range of 10 to 60% by weight.

7 Claims, No Drawings

POLYMER LATEX PRODUCTION METHOD

TECHNICAL FIELD

The present invention relates to a meth for producing a polymer latex that is excellent in productivity and that can provide a dip molded article high in tensile strength.

BACKGROUND ART

It has been conventionally known that a dip molded article for use in contact with the human body, such as a nipple, an air ball, a glove, a balloon and a sack, is obtained by dip molding of a latex composition containing a latex of natural rubber. A latex of natural rubber, however, contains a protein causing an allergy symptom in the human body, and the is problematic in terms of use in a dip molded article that is in direct contact with the mucous membrane or organs of a living body. Therefore, studies about use of not a latex of natural rubber, but a latex of synthetic polyisoprene or styrene-isoprene-styrene block copolymer have been increasingly made (Patent Document 1).

For example, Patent Document 1 discloses a method for producing an artificial latex, including a cement formation step of dissolving rubber such as synthetic polyisoprene in a hydrocarbon solvent, a step of emulsifying the resulting cement together with an aqueous soap solution to form an oil in-water emulsion, and a step of removing the hydrocarbon solvent to produce a latex of rubber having a median particle size in the range of 0.5 to 2.0 μm. A dip molded article obtained using an artificial latex obtained according to the technique of Patent Document 1, however, is not sufficient in tensile strength and therefore has been demanded to be further improved in tensile strength.

RELATED ART

Patent Document

Patent Document 1: Japanese Patent No. 5031821

SUMMARY OF THE INVENTION

Problem to be Solved by the Invention

The present invention has been made in view of such circumstances, and an object thereof is to provide a polymer latex that is excellent in productivity and that can provide a dip molded article high in tensile strength.

Means for Solving the Problem

The present inventors have made intensive studies in order to achieve the above object, and as a result, have found that the above object can be achieved by the following: when a polymer latex is produced by emulsifying a polymer solution of synthetic polyisoprene and/or a styrene-isoprene-styrene block copolymer in water in the presence of a surfactant, as the synthetic polyisoprene and/or styrene-isoprene-styrene block copolymer, used are/is synthetic polyisoprene and/or a styrene-isoprene-styrene block copolymer which have/has a molecular weight distribution within a predetermined range and which, when dissolved in an organic solvent to thereby be formed into a polymer solution having a predetermined viscosity, have/has a solid content concentration in a specified range; thereby leading to completion of the present invention.

That is, according to the present invention, there is provided a method for producing a polymer latex, including an emulsification step of emulsifying a polymer solution obtained by dissolution of synthetic polyisoprene and/or a styrene-isoprene-styrene block copolymer having a molecular weight distribution of 1.0 to 2.6 in an organic solvent, in water in the presence of a surfactant, to thereby obtain an emulsified liquid, wherein as the synthetic polyisoprene and/or styrene-isoprene-styrene block copolymer, used are/is synthetic polyisoprene and/or a styrene-isoprene-styrene block copolymer which, when dissolved in an organic solvent to thereby be formed into a polymer solution having a viscosity at a temperature of 60° C. of 20,000 cps, have/has a solid content concentration in the range of 10 to 60% by weight.

It is preferable in the method for producing a polymer latex of the present invention that as the synthetic polyisoprene and/or styrene-isoprene-styrene block copolymer be used synthetic polyisoprene and/or a styrene-isoprene-styrene block copolymer which, when dissolved in n-hexane to thereby be formed into a polymer solution having a viscosity at a temperature of 60° C. of 20,000 cps, have/bas a solid content concentration in the range of 10 to 60% by weight.

It is preferable in the method for producing a polymer latex of the present invention that the method further include a polymerization step of polymerizing a monomer in an organic solvent to thereby obtain a polymer solution of synthetic polyisoprene and/or a styrene-isoprene-styrene block copolymer and the polymer solution obtained in the polymerization step be used without coagulation as the polymer solution in the emulsification step. It is also preferable that polymerization of the monomer be performed using an alkyllithium polymerization catalyst.

The method for producing a polymer latex of the present invention preferably further includes a solvent removal step of removing the organic solvent in the emulsified liquid and a centrifugation step of centrifuging the emulsified liquid from which the organic solvent is removed, to thereby concentrate the emulsified liquid.

It is preferable in the method for producing a polymer latex of the present invention that the surfactant be sodium rosinate and/or potassium rosinate.

In addition, according to the present invention, there is provided a method for producing a latex composition, including a step of adding a crosslinking agent to a polymer latex obtained by the production method.

Furthermore, according to the present invention, there is provided a method for producing a dip molded article, including a step of dip molding a latex composition obtained by the production method.

Effects of Invention

According to the present invention, there can provide a polymer latex that is excellent in productivity and that can provide a dip molded article high in tensile strength, and a dip molded article that is obtained using such a polymer latex and that has a high tensile strength.

DESCRIPTION OF EMBODIMENTS

The production method of the present invention is a method for producing a polymer latex, including an emulsification step of emulsifying a polymer solution obtained by dissolution of synthetic polyisoprene and/or a styrene-isoprene-styrene block copolymer having a molecular weight distribution of 1.0 to 2.6 in an organic solvent, in water in the presence of a surfactant, to thereby obtain an emulsified liquid, wherein as the synthetic polyisoprene and/or styrene-isoprene-styrene block copolymer, used are/is synthetic polyisoprene and/or a styrene-isoprene-styrene block copolymer which, when dissolved in an organic solvent to thereby be formed into a polymer solution having a viscosity at a temperature of 60° C. of 20,000 cps, have/has a solid content concentration in the range of 10 to 60% by weight.

Polymer Solution of Synthetic Polyisoprene

First, the polymer solution of synthetic polyisoprene for use in the production method of the present invention is described.

With respect to the polymer solution of synthetic polyisoprene for use in the present invention, the synthetic polyisoprene included may be a homopolymer of isoprene or maybe obtained by copolymerization with other ethylenically unsaturated monomer copolymerizable with isoprene. The content of the isoprene unit in the synthetic polyisoprene is preferably 70% by weight or more, more preferably 90% by weight or more, further preferably 95% by weight or more, particularly preferably 100% by weight (homopolymer of isoprene) based on the total monomer unit from the viewpoint that a flexible dip molded article excellent in tensile strength is easily obtained.

Examples of such other ethylenically unsaturated monomer copolymerizable with isoprene include conjugated diene monomers other than isoprene, such as butadiene, chloroprene and 1,3-pentadiene; ethylenically unsaturated nitrile monomers such as acrylonitrile, methacrylonitrile, fumaronitrile and α-chloroacrylonitrile; vinyl aromatic monomers such as styrene and alkylstyrene; and ethylenically unsaturated carboxylic acid ester monomers such as methyl (math)acrylate (which means "methyl acrylate and/or methyl methacrylate"; hereinafter, much the same is true on ethyl (meth)acrylate and the like.), ethyl (meth)acrylate, butyl (meth)acrylate and 2-ethylhexyl (meth)acrylate. Such other ethylenically unsaturated monomers copolymerizable with isoprene may be used singly or in combinations of two or more kinds thereof.

In the polymer solution of synthetic polyisoprene in the present invention, as the synthetic polyisoprene, used is synthetic polyisoprene which has a molecular weight distribution (Mw/Mn) of 1.0 to 2.6 and which, when dissolved in an organic solvent to thereby be formed into a polymer solution having a viscosity at a temperature of 60° C. of 20,000 cps, has a solid content concentration in the range of 10 to 60% by weight.

According to the present invention, the molecular weight distribution (Mw/Mn) can be in the above range, thereby properly enhancing the tensile strength of the resulting dip molded article while suppressing an increase in the viscosity of the polymer solution obtained by dissolution of the synthetic polyisoprene in the organic solvent. On the other hand, if the molecular weight distribution (Mw/Mn) is too large, the resulting dip molded article is inferior in tensile strength. The molecular weight distribution (Mw/Mn) is 1.0 to 2.6, preferably 1.0 to 2.4, more preferably 1.0 to 2.2, most preferably 1.0 to 1.5.

Herein, the molecular weight distribution (Mw/Mn) can he determined from the weight average molecular weight (Mw) in terms of standard polystyrene by gel permeation Chromatography analysis and the number average molecular weight (Mn) in terms of standard polystyrene by gel permeation chromatography analysis.

In addition, according to the present invention, any synthetic polyisoprene which, when formed into a polymer solution having a viscosity at a temperature of 60° C. of 20,000 cps, has a solid content concentration in the above range can be used to thereby produce a polymer latex at a high productivity. Specifically, the temperature at which emulsification in an emulsification step described below can be favorably performed can be 60° C. and the upper limit of the solution viscosity can be usually about 20,000 cps, and the solid content concentration at such a solution viscosity can he adjusted in the range of 10 to 60% by weight to thereby allow emulsification to be performed at a production rate (the amount of production per unit time), resulting in production of a polymer latex to at a high productivity. If the solid content concentration is less than 10% by weight, the production rate (the amount of production per unit time) in emulsification is decreased to result in deterioration in productivity. On the other hand, if the solid content concentration is more than 60% by weight, moldability is deteriorated to make molding by dip molding or the like difficult. The solid content concentration in the case of a polymer solution having a viscosity at a temperature of 60° C. of 20,000 cps, is in the range of 10 to 60% by weight, preferably in the range of 15 to 50% by weight, more preferably in the range of 20 to 40% by weight.

Herein, the solid content concentration of synthetic polyisoprene in the form of a polymer solution having a viscosity at a temperature of 60° C. of 20,000 cps, can be determined by preparing a polymer solution having a viscosity at a temperature of 60° C. of 20,000 cps, by adjustment of the amount of the organic solvent in the polymer solution, and measuring the solid content concentration of the solution prepared. The viscosity of the polymer solution can he measured by using, for example, a B-type viscometer.

The organic solvent contained in the polymer solution in this case may be any solvent that can dissolve the synthetic polyisoprene, and examples thereof can include aromatic hydrocarbon solvents such as benzene, toluene and xylene; alicyclic hydrocarbon solvents such as cyclopentane, cyclopentene, cyclohexane and cyclohexene; aliphatic hydrocarbon solvents such as pentane, hexane and heptane; and halogenated hydrocarbon solvents such as methylene chloride, chloroform and ethylene dichloride. Among them, alicyclic hydrocarbon solvents or aliphatic hydrocarbon solvents are preferable, n-hexane and cyclohexane are more preferable, and n-hexane is particularly preferable.

Herein, when the polymer solution of synthetic polyisoprene is emulsified in water in the presence of a surfactant to thereby obtain an emulsified liquid, as described below, in the production method of the present invention, the polymer solution of synthetic polyisoprene, actually used, is not particularly limited to a polymer solution having a viscosity at a temperature of 60° C. of 20,000 cps, and a polymer solution that is adjusted so as to have a different viscosity, such as a polymer solution having a viscosity at a temperature of 60° C., of about 15,000, may be used, but a polymer solution having a viscosity at a temperature of 60° C., of about 20,000 cps (for example, a polymer solution having a viscosity at a temperature of 60° C. of 20,000 cps±100 cps) is preferably used from the viewpoint that the solid content concentration of the synthetic polyisoprene in the polymer solution can be more increased to thereby allow the production rate (the amount of production per unit time) in emulsification to be more increased.

In the case of synthetic polyisoprene that has a molecular weight distribution (Mw/Mn) of 1.0 to 2.6 and that is formed into a polymer solution having a viscosity at a temperature of 60° C. of 20,000 cps, in the production method of the present invention, the method for allowing the solid content concentration to be in the range of 10 to 60% by weight is not particularly limited, and, for example, the solid content concentration can be controlled by appropriately combining a method for adjusting the amount of a polymerization catalyst used and a method for adjusting the polymerization temperature.

The polymer solution of synthetic polyisoprene, for use in the present invention, can be obtained by, for example, solution polymerization of a monomer including isoprene and other ethylenically unsaturated monomer copolymerizable therewith, if necessary used, in an organic solvent by use of an alkyllithium polymerization catalyst such as n-butyllithium or sec-butyllithium. In particular, according to the present invention, the alkyllithium polymerization catalyst is desirably used to perform polymerization because the polymerization conversion rate can be preferably thus allowed to be 97% by weight or more, more preferably 99% by weight or more, thereby allowing the amount of the remaining monomer to be reduced, and therefore the amount of the remaining monomer in the resulting emulsified liquid can be decreased even in the case where the polymer solution obtained is directly emulsified without undergoing any step such as coagulation and re-dissolution for removal of the remaining monomer.

The amount of the polymerization catalyst used is preferably 0.0070 to 0.085 parts by weight, more preferably 0.0076 to 0.056 parts by weight, further preferably 0.0084 to 0.042 parts by weight based on 100 parts by weight of the monomer for use in polymerization, from the viewpoint that the resulting synthetic polyisoprene is made so as to have a molecular weight distribution (Mw/Mn) of 1.0 to 2.6 and, when formed into a polymer solution having a viscosity at a temperature of 60° C. of 20,000 cps, so as to have a solid content concentration in the range of 10 to 60% by weight.

The organic solvent may be any organic solvent that is inert to the polymerization reaction, and, for example, the above organic solvent can be used. The amount of the organic solvent used is preferably 250 to 2000 parts by weight, more preferably 400 to 1250 parts by weight based on 100 parts by weight of the monomer for use in polymerization.

The polymerization temperature in solution polymerization of the monomer including isoprene and other ethylenically unsaturated monomer copolymerizable therewith, if necessary used, is preferably 40 to 80° C., more preferably 45 to 75° C. from the viewpoint that the resulting synthetic polyisoprene is made so as to have a molecular weight distribution (Mw/Mn) of 1.0 to 2.6 and, when formed into a polymer solution having a viscosity at a temperature of 60° C. of 20,000 cps, so as to have a solid content concentration in the range of 10 to 60% by weight.

The polymer solution of synthetic polyisoprene can be thus obtained by solution polymerization of the monomer including isoprene in the production method of the present invention, and the polymer solution thus obtained by solution polymerization is preferably used as it is without coagulation and emulsified in water in the presence of a surfactant in the production method of the present invention. Once the polymer solution is, for example, coagulated, the molecular weight distribution (Mw/Mn) of the synthetic polyisoprene may be too high due to heat history or the like in coagulation, consequently causing the resulting dip molded article to be inferior in tensile strength, and therefore the polymer solution. is preferably used as it is without coagulation. In this case, for example, an organic solvent may be added in order to adjust the viscosity of the polymer solution, and the like.

The isoprene unit in the synthetic polyisoprene is present in the form of four types including a cis bond unit, a trans bond unit, a 1,2-vinyl bond unit and a 3,4-vinyl bond unit depending on the binding state of isoprene. The content rate of the cis bond unit in the isoprene unit included in the synthetic polyisoprene is preferably 70% by Weight or more, more preferably 72% by weight or more, further preferably 75% by weight or more based on the total isoprene unit from the viewpoint of an enhancement in tensile strength of the resulting dip molded article.

The weight average molecular weight (Mw) of the synthetic polyisoprene is usually 100,000 to 1,500,000, preferably 300,000 to 1,200,000, more preferably 400,000 to 1,100,000, most preferably 500,000 to 1,000,000 in terms of standard polystyrene by gel permeation chromatography analysis from the viewpoint that the synthetic polyisoprene, when formed into a polymer solution having a viscosity at a temperature of 60° C. of 20,000 cps, has a solid content concentration in the range of 10 to 60% by weight.

Polymer Solution of Styrene-Isoprene-Styrene Block Copolymer

Next, the polymer solution of styrene-isoprene-styrene block copolymer for use In the production method of the present invention. is described.

In the polymer solution of styrene-isoprene-styrene block copolymer for use in the present invention, the styrene-isoprene-styrene block copolymer is a block copolymer of styrene and isoprene, and the content ratio of the styrene unit and the isoprene unit in the styrene-isoprene-styrene block copolymer is usually in the range of 1:99 to 90:10, preferably 3:97 to 70:30, more preferably 5:95 to 50:50, further preferably 10:90 to 30:70 as the weight ratio of "styrene unit:isoprene unit".

In the polymer solution of styrene-isoprene-styrene block copolymer in the present invention, as the styrene-isoprene-styrene block copolymer, used is a styrene-isoprene-styrene block copolymer which has a molecular weight distribution (Mw/Mn) of 1.0 to 2.6 and which, when dissolved in an organic solvent to thereby be formed into a polymer solution having a viscosity at a temperature of 60° C. of 20,000 cps, has a solid content concentration in the range of 10 to 60% by weight.

According to the present invention, the molecular weight distribution (Mw/Mn) can be in the above range, thereby properly enhancing the tensile strength of the resulting dip molded article while suppressing an increase in the viscosity of the polymer solution obtained by dissolution of the styrene-isoprene-styrene block copolymer in the organic solvent. On the other hand, if the molecular weight distribution (Mw/Mn) is too large, the resulting dip molded article is inferior in tensile strength. The molecular weight distribution (Mw/Mn) is 1.0 to 2.6, preferably 1.0 to 2.4, more preferably 1.0 to 2.2.

In addition, according to the present invention, any styrene-isoprene-styrene block copolymer which, when formed into a polymer solution having a viscosity at a temperature of 60° C. of 20,000 cps, has a solid content concentration in the above range can be used to thereby produce a polymer latex at a high productivity for the same reason as in the case of the above synthetic polyisoprene. If the solid content concentration is less than 10% by weight, the production rate (the amount of production per unit time) in emulsification is decreased to result in deterioration in productivity. On the other hand, if the solid content concentration is more than 60% by weight, moldability is deteriorated to make molding by dip molding or the like difficult. The solid content concentration in the case of a polymer solution having a viscosity at a temperature of 60° C. of 20,000 cps, is in the range of 10 to 60% by weight, preferably in the range of 15 to 57% by weight, more preferably in the range of 20 to 55% by weight. The organic solvent that can be here used is the same as in the case of the synthetic polyisoprene.

Herein, when the polymer solution of styrene-isoprene-styrene block copolymer is emulsified in water in the presence of a surfactant to thereby obtain an emulsified liquid, as described below, in the production method of the present invention, the polymer solution of styrene-isoprene-styrene block copolymer, actually used, is not particularly limited to a polymer solution having a viscosity at a temperature of 60° C. of 20,000 cps, and a polymer solution that is adjusted so as to have a different viscosity, such as a polymer solution having a viscosity at a temperature of 60° C., of about 15,000, may be used, but a polymer solution having a viscosity at a temperature of 60° C., of about 20,000 cps (for example, a polymer solution having a viscosity at a temperature of 60° C. of 20,000 cps ±100 cps) is preferably used from the viewpoint that the solid content concentration of the polymer solution of styrene-isoprene-styrene block copolymer can be more increased to thereby allow the production rate (the amount of production per unit time) in emulsification to be more increased.

In the case of a styrene-isoprene-styrene block copolymer that has a molecular weight distribution (Mw/Mn) of 1.0 to 2.6 and that is formed into a polymer solution having a viscosity at a temperature of 60° C. of 20,000 cps, in the production method of the present invention, the method for allowing the solid content concentration to be in the range of 10 to 60% by weight is not particularly limited, and the solid content concentration can be controlled by appropriately combining a method for adjusting the amount of a polymerization catalyst used and a method for adjusting the polymerization temperature, as in the case of the synthetic polyisoprene.

The polymer solution of styrene-isoprene-styrene block copolymer for use in the present invention can be obtained by, for example, solution polymerization of a styrene-containing monomer and an isoprene-containing monomer in an organic solvent by use of an alkyllithium polymerization catalyst such as n-butyllithium or sec-butyllithium. In particular, according to the present invention, the alkyllithium polymerization catalyst is desirably used to perform polymerization because the polymerization conversion rate can be preferably thus allowed to be 97t by weight or more, more preferably 99% by weight or more, thereby allowing the amount of the remaining monomer to be reduced, and therefore the amount of the remaining monomer in the resulting emulsified liquid can be decreased even in the case where the polymer solution obtained is directly emulsified without undergoing any step such as coagulation and re-dissolution for removal of the remaining monomer.

The amount of the polymerization catalyst used is preferably 0.030 to 0.34 parts by weight, more preferably 0.038 to 0.24 parts by weight, further preferably 0.044 to 0.17 parts by weight based on 100 parts by weight of the monomer for use in polymerization, from the viewpoint that the resulting styrene-isoprene-styrene block copolymer is made so as to have a molecular weight distribution (Mw/Mn) of 1.0 to 2.6 and, when formed into a polymer solution having a viscosity at a temperature of 50° C. of 20,000 cps, so as to have a solid content concentration in the range of 10 to 60% by weight.

The organic solvent may be any organic solvent that is inert, to the polymerization reaction, and, for example, the above organic solvent can be used. The amount of the organic solvent used is preferably 75 to 570 parts by weight, more preferably 80 to 400 parts by weight based on 100 parts by weight of the monomer for use in polymerization.

The polymerization temperature in solution polymerization of the styrene-containing monomer and the isoprene-containing monomer is preferably 35 to 80° C., more preferably 40 to 75° C. from the viewpoint that the resulting synthetic polyisoprene is made so as to have a molecular weight distribution (Mw/Mn) of 1.0 to 2.6 and, when formed into a polymer solution having a viscosity at a temperature of 60° C. of 20,000 cps, so as to have a solid content concentration in the range of 10 to 60% by weight.

The polymer solution of styrene-isoprene-styrene block copolymer can be thus obtained by solution polymerization of the styrene-containing monomer and the isoprene-containing monomer in the production method of the present invention, and the polymer solution thus obtained by solution polymerization is preferably used as it is without coagulation and emulsified in water in the presence of a surfactant in the production method of the present invention. Once the polymer solution is, for example, coagulated, the molecular weight distribution (Mw/Mn) of the styrene-isoprene-styrene block copolymer may be too high due to heat history or the like in coagulation, consequently causing the resulting dip molded article to be inferior in tensile strength, and therefore the polymer solution is preferably used as it is without coagulation. In this case, for example, an organic solvent may be added in order to adjust the viscosity of the polymer solution, and the like.

The weight average molecular weight (Mw) of the styrene-isoprene-styrene block copolymer is preferably 50,000 to 500,000, more preferably 70,000 to 400,000, further preferably 100,000 to 350,000 in terms of standard polystyrene by gel permeation chromatography analysis.

Emulsification Step

The emulsification step in the production method of the present invention is a step of emulsifying the above-mentioned polymer solution of synthetic polyisoprene and/or a styrene-isoprene-styrene block copolymer in water in the presence of a surfactant, to thereby obtain an emulsified liquid.

As described above, it is preferable in the emulsification step in the production method of the present invention that the polymer solution obtained by the above-mentioned polymerization method be used as the polymer solution of synthetic polyisoprene and/or a styrene-isoprene-styrene block copolymer as it is without coagulation and emulsified in water in the presence of a surfactant. On the contrary, once the polymer solution is, for example, coagulated, the molecular weight distribution (Mw/Mn) of the synthetic polyisoprene and/or the styrene-isoprene-styrene block copolymer may be too high due to heat history or the like in coagulation, consequently causing the resulting dip molded article to be inferior in tensile strength, and on the other hand, the polymer solution can he used as it is without coagulation and emulsified, thereby allowing the occurrence of such failure to be effectively prevented.

Ln the emulsification step of the production method of the present invention, as the polymer solution of synthetic polyisoprene and/or a styrene-isoprene-styrene block copolymer is used a polymer solution which has a solid content concentration in the range of 10 to 60% by weight when being in the form of a polymer solution having a viscosity at a temperature of 60° C. of 20,000 cps, obtained by dissolution in an organic solvent, and therefore emulsification can be performed at a proper production rate (the amount of production per unit time), resulting in production of a polymer latex to at a high productivity.

The surfactant for use in the emulsification step in the production method of the present invention is not particularly limited, and an anionic surfactant can be preferably used. Examples of the anionic surfactant include fatty acid salts such as sodium laurate, potassium myristate, sodium palmitate, potassium oleate, sodium linoleate and sodium rosinate; alkylbenzenesulfonic acid salts such as sodium dodecylbenzenesulfonate, potassium dodecylbenzenesulfonate, sodium decylbenzenesulfonate, potassium decylbenzenesulfonate, sodium cetylbenzenesulfonate and potassium cetylbenzenesulfonate; alkylsulfosuccinic acid salts such as sodium di(2-ethylhexyl)sulfosuccinate, potassium di(2-ethylhexyl)sulfosuccinate and dioctyl sodium sulfosuccinate; alkylsulfuric acid ester salts such as sodium lauryl sulfate and potassium lauryl sulfate; polyoxyethylene alkyl ether sulfuric acid ester salts such as sodium polyoxyethylene lauryl ether sulfate and potassium polyoxyethylene lauryl ether sulfate; and monoalkylphosphoric acid salts such as sodium lauryl phosphate and potassium lauryl phosphate.

Among these anionic surfactants, fatty acid salts, alkylbenzenesulfonic acid salts, alkylsulfosuccinic acid salts, alkylsulfuric acid ester salts and polyoxyethylene alkyl ether sulfuric acid ester salts are preferable, and fatty acid salts and alkylbenzenesulfonic acid salts are particularly preferable.

It is preferable to use at least one selected from the group consisting of alkyabenzenesulfonic acid salts, alkylsulfosuccinic acid salts, alkylsulfuric acid ester salts and polyoxyethylene alkyl ether sulfuric acid ester salts, and any fatty acid salt in combination, and it is particularly preferable to use any alkylbenzenesulfonic acid salt and any fatty acid salt in combination because the occurrence of an aggregate in production of a polymer latex is suppressed. Here, preferable fatty acid salts are sodium rosinate and potassium rosinate, and preferable alkylbenzenesulfonic acid salts are sodium dodecylbenzenesulfonate and potassium dodecylbenzenesulfonate. Such surfactants may be used singly or in combinations of two or more kinds thereof.

Furthermore, a surfactant other than the anionic surfactant may be used in combination in the production method of the present invention, and examples of such a surfactant other than the anionic surfactant include copolymerizable surfactants such as α,β-unsaturated carboxylic acid sulfoester, α,β-unsaturated carboxylic acid sulfate ester and sulfoalkyl aryl ether.

Any nonionic surfactant such as polyoxyethylene alkyl ether, polyoxyathylene alkylphenol ether, polyoxyethylene alkyl ester or polyoxyethylene sorbitan alkyl ester may be used as long as such a nonionic surfactant does not inhibit coagulation by a coagulating agent for use in dip molding.

The amount of the surfactant used is preferably 0.1 to 50 parts by weight, more preferably 0.5 to 40 parts by weight, further preferably 5 to 30 parts by weight based on 100 parts by weight in total of the synthetic polyisoprene and the styrene-isoprene-styrene block copolymer included in the polymer solution. When two or more surfactants are used, the amount of the total thereof used is preferably in the above range. If the amount of the surfactant used is too small, an aggregate may occur in a large amount in emulsification, and on the contrary, if the amount is too large, foaming can occur to cause a pinhole to be generated in the resulting dip molded article.

The amount of water for use in the emulsification step in the production method of the present invention is preferably 10 to 1,000 parts by weight, more preferably 30 to 500 parts by weight, most preferably 50 to 100 parts by weight based on 100 parts by weight of the polymer solution of synthetic polyisoprene and styrene-isoprene-styrene block copolymer (organic solvent solution). Examples of the types of water used include hard water, soft water, ion-exchange water, distilled water and zeolite water, and soft water, ion-exchange water and distilled water are preferable.

When the polymer solution of synthetic polyisoprene and/or a styrene-isoprene-styrene block copolymer is emulsified in water in the presence of the surfactant, an emulsifying apparatus commonly commercially available as an emulsifying machine or a dispersing machine can be used without any particular limitation. The method for adding the surfactant to the polymer solution of synthetic polyisoprene and/or a styrene-isoprene-styrene block copolymer is not particularly limited, and the surfactant may be added to any one or both of water and the polymer solution of synthetic polyisoprene and/or a styrene-isoprene-styrene block copolymer, may be added to the emulsified liquid during an emulsifying operation, or may be added collectively or in portions.

As the emulsifying apparatus, for example, a batch type emulsifying machine such as trade name "Homogenizer" (manufactured by IKA), trade name "Polytron" (manufactured by Kinematica) or trade name "TK Auto Homomixer" (manufactured by Primix Corporation); a continuous emulsifying machine such as trade name "TK-pipeline homomixer" (manufactured by Primix Corporation), trade name "Colloid Mill" (manufactured by Shinko Pantech Co., Ltd.), trade name "Blusher" (manufactured by Nippon Coke & Engineering. Co., Ltd.), trade name "Trigonal wet fine pulverizer" (manufactured by Mitsui Miike Machinery Co., Ltd.), trade name "Cavirton" (manufactured by Eurotech Co., Ltd.), trade name "Milder" (manufactured by Pacific Machinery & Engineering Co., Ltd.) or trade name "Fine flow mill" (manufactured by Pacific Machinery & Engineering Co., Ltd.); a high-pressure emulsifying machine such as trade name "Microfluidizer" (manufactured by Mizubo Industrial Co., Ltd.), trade name "Nanomizer" (manufactured by Nanomizer Inc.) or trade name "APV Gaulin" (manufactured by APV Gaulin Inc.); a membrane emulsifying machine such as trade name "Membrane emulsifying machine" (manufactured by Reica Co., Ltd.); a vibration type emulsifying machine such as trade name "Vibromixer" (manufactured by Reica Co., Ltd.); or an ultrasonic emulsifying machine such as trade name "Ultrasonic homogenizer" (manufactured by Branson Ultrasonics, Emerson Japan, Ltd.); can be used. Herein, the emulsifying operation conditions by the emulsifying apparatus are not particularly limited, and the treatment temperature and the treatment time may be appropriately selected so that a desired dispersing state is achieved.

It is desirable in the production method of the present invention to remove the organic solvent from the emulsified liquid obtained in the emulsification step. The method for removing the organic solvent from the emulsified liquid is preferably a method which enables the content of the organic solvent (preferably aliphatic hydrocarbon solvent) in the emulsified liquid to be 500 ppm by weight or less, and a method of distillation under reduced pressure, atmospheric distillation, steam distillation, centrifugation or the like can be adopted.

To the polymer latex thus obtained may be compounded additive(s) commonly compounded in the latex field, such as a pH adjuster, a defoamer, a preservative, a chelating agent, an oxygen scavenger, a dispersing agent and an antioxidant.

Examples of the pH adjuster include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; and organic amine compounds such as trimethylamine and triethanolamine, and alkali metal hydroxide or ammonia is preferable.

A concentration operation may be, if necessary, conducted according to a method such as distillation under reduced pressure, atmospheric distillation, centrifugation, or membrane concentration in order to increase the solid content concentration of the polymer latex, and centrifugation is preferably performed from the viewpoint that the remaining amount of the surfactant in the polymer latex can be adjusted.

When the polymer latex is subjected to a centrifuge machine, a pH adjuster is preferably added in advance to adjust the pH of the polymer latex to 7 or more, more preferably 9 or more for an enhancement in mechanical stability of the polymer latex. As the pH adjuster, alkali metal hydroxide such as sodium hydroxide or potassium hydroxide, or ammonia is preferable.

The centrifugation is preferably performed in conditions of, for example, preferably a centrifugal force of 4,000 to 5,000 G by use of a continuous centrifuge machine, preferably a solid content concentration of the polymer latex before the centrifugation, of 2 to 15% by weight, preferably a flow rate for feeding into the centrifuge machine, of 500 to 2000 Kg/hr, and preferably a back pressure (gauge pressure) of the centrifuge machine, of 0.03 to 1.6 MPa.

The volume average particle size of the polymer latex produced by the production method of the present invention is preferably 0.1 to 10 µm, more preferably 0.5 to 3 µm, further preferably 1 to 2 µm. The volume average particle size can be in the above range, thereby imparting a proper latex viscosity to thereby facilitate handling, and inhibiting a film from being generated on the latex surface in storage of the polymer latex.

The solid content concentration of the polymer latex produced by the production method of the present invention is preferably 30 to 70% by weight, more preferably 40 to 70% by weight. The solid content concentration can be in the above range, thereby not only suppressing separation of a polymer particle in storage of the polymer latex, but also suppressing the occurrence of a coarse aggregate due to polymer particle aggregation.

The total content of the surfactant in the polymer latex produced by the production method of the present invention is preferably 5 parts by weight or less, more preferably 3 parts by weight or less, further preferably 0.1 to 3 parts by weight based on 100 parts by in total of the synthetic polyisoprene and the styrene-isoprene-styrene block copolymer, When the total content of the surfactant is in the above range, a dip molded article there the occurrence of foaming is suppressed, tensile strength is excellent and no pinhole occurs is easily obtained.

The viscosity of the polymer late produced by the production method of the present invention is usually 1 to 1000 mPa·s, preferably 30 to 500 mPa·s, more preferably 50 to 400 mPa·s, further preferably 100 to 300 mPa·s. The viscosity of the polymer latex can be measured, for example, by use of a B-type viscometer at ordinary temperature (25° C.). The viscosity of the polymer latex can be in the above range, thereby allowing dip molding to be more properly performed.

Latex Composition

The latex composition of the present invention is obtained by adding a crosslinking agent to the polymer latex containing synthetic polyisoprene and/or the styrene-isoprene-styrene block copolymer obtained by the production method of the present invention.

Examples of the crosslinking agent include sulfur such as powdered sulfur, sublimed sulfur, precipitated sulfur, colloidal sulfur, surface-treated sulfur and insoluble sulfur; and sulfur-containing compounds such as sulfur chloride, sulfur dichloride, morpholine-disulfide, alkylphenol-disulfide, caprolactam-disulfide (N,N'-dithio-bis(hexahydro-2H-azepinone-2)), phosphorus-containing polysulfide, polymeric polysulfide and 2-(4'-morpholinodithio)benzothiazole. Among them, sulfur can be preferably used. Such crosslinking agents can be used singly or in combinations of two or more kinds thereof.

The content of the crosslinking agent is not particularly limited, and is preferably 0.1 to 10 parts by weight, more preferably 0.2 to 3 parts by weight based on 100 parts by weight in total of the synthetic polyisoprene and the styrene-isoprene-styrene block copolymer. The content of the crosslinking agent can be in the above range, thereby more enhancing the tensile strength of the resulting dip molded article.

The latex composition of the present invention preferably further contains a crosslinking accelerator.

A crosslinking accelerator usually used in dip molding can be used as the crosslinking accelerator, and examples include dithiocarbamic acids such as diethyldithicoarbamic acid, dibutyldithiocarbamic acid, di-2-ethylhexyldithiocarbamic acid, dicyclchexyldithiocarbamic acid, diphenyldithiocarbamic acid and dibenzyldithiocarbamic acid, and zinc salts thereof; and 2-mercaptobenzothiazole, zinc 2-mercaptobenzothiazole, 2-mercaptothiazoline, dibenzothiazyl-disulfide, 2-(2,4-dinitrophenylthio)benzothiazole, 2-(N,N-diethylthio-carbarylthio)benzothiazole, 2-(2, 6-dimethyl-4-morpholinothio)benzothiazole, 2-(4'-morpholino-dithio) benzothiazole, 4-morpholinyl-2-benzothiazyl-disulfide and 1,3-bis(2-benzothiazyl-mercantomethyl)urea, and zinc diethyldithiocarbamate, zinc 2-dibutyldithiocarbamate and zinc 2-mercaptobenzothiazole are preferable. Such crosslinking accelerators can be used singly or in combinations of two or more kinds thereof.

The content of the crosslinking accelerator is preferably 0.05 to 5 parts by weight, more preferably 0.1 to 2 parts by weight based on 100 parts by weight in total of the synthetic polyisoprene and the styrene-isoprene-styrene block copolymer. The content of the crosslinking accelerator can be in the above range, thereby more enhancing the tensile strength of the resulting dip molded article.

The latex composition of the present invention preferably further contains zinc oxide.

The content of the zinc oxide is not particularly limited, and is preferably 0.1 to 5 parts by weight, more preferably 0.2 to 2 parts by weight based on 100 parts by weight in total of the synthetic polyisoprene and the styrene-isoprene-styrene block copolymer. The content of the zinc oxide can be in the above range, thereby more enhancing the tensile strength of the resulting dip molded article, with emulsification stability being favorable.

To the latex composition of the present invention can be, if necessary, compounded a compounding agent, for example, an antioxidant; a dispersing agent; a reinforcement agent such as carbon black, silica or talc; a filler such as calcium carbonate or clay; an ultraviolet absorber; or a plasticizer.

Examples of the antioxidant include phenol-based antioxidants containing no sulfur atom, such as 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl)propionate, styrenated phenol, 2,2'-Methylene-bis(6-α-methyl-benzyl-p-cresol), 4,4'-methylenebis(2,6-di-t-butylphenol), 2,2'-methylene-bis(4-methyl -6-t-butylphenol), alkylated bisphenol, and a butylated reaction product of p-cresol and dicyclopentadien; thiobisphenol-based antioxidants such as 2,2'-thiobis-(4-methyl-6-t-butylphenol), 4,4'-thiobis-(6-t-butylphenol) and 2,6di-t-butyl-4-(4,6 -bis(octylthio)-1,3,5-triazine-2-ylamino)phenol; phosphorous acid ester-based antioxidants such as tris (nonylphenyl)phosphite, diphenylisodecyl phosphite and tetraphenyl dipropylene glycol-diphosphite; sulfur ester-based antioxidants such as dilauryl thiodipropionate; amine-based antioxidants such as phenyl-α-naphthylamine, phenyl-β-naphthylamine, p-(p-toluenesulfonylamide)-diphenylamine, 4,4'-(α,α-dimethylbenzyl)diphenylamine, N,N-diphenyl-p-phenylenethamine, N-isopropyl-N'-phenyl-p-phenylenediamine and a butylaldehyde-aniline condensate; quinoline-based antioxidants such as 6-ethoxy-2,2,4-trimethyl-1,2-dihydroquinone; and hydroquinone-based antioxidants such as 2,5-di-(t-amyl)hydroquinone. Such antioxidants can be used singly or in combinations of two or more kinds thereof.

The content of the antioxidant s preferably 0.05 to 10 parts by weight, more preferably 0.1 to 5 parts by weight based on 100 parts by weight in total of the synthetic polyisoprene and the styrene-isoprene-styrene block copolymer.

Examples of the method for preparing the latex composition of the present invention include, but are not particularly limited, a method including mixing the crosslinking agent and various compounding agents, if necessary compounded, with the polymer latex containing synthetic polyisoprene and/or a styrene-isoprene-styrene block copolymer by use of a dispersing machine such as a ball mill, a kneader or a disper, and a method including preparing an aqueous dispersion liquid of compounding components other than the polymer latex containing synthetic polyisoprene and/or a styrene-isoprene-styrene block copolymer, by use of the above dispersing machine, and thereafter mixing the aqueous dispersion liquid with the polymer latex containing synthetic polyisoprene and/or a styrene-isoprene-styrene block copolymer.

The pH of the latex composition of the present invention is preferably 7 or more, more preferably it the range of 7 to 13, further preferably in the range of 8 to 12. The solid content concentration of the latex composition is preferably in the range of 15 to 65% by weight.

The latex composition of the present invention is preferably subjected to aging (pre-crosslinking) before dip molding from the viewpoint that mechanical properties of the resulting dip molded article are more enhanced. The pre-crosslinking time is not particularly limited and is preferably 1 to 14 days, more preferably 1 to 7 days, depending on the pre-crosslinking temperature. Herein, the pre-crosslinking temperature is preferably 20 to 40° C.

The resultant is preferably stored at a temperature of 10 to 30° C. for the period from completion of the pre-crosslinking to dip molding. If the resultant is stored at a high temperature, the tensile strength of the resulting dip molded article may be reduced.

Dip Molded Article

The dip molded article of the present invention is obtained by dip molding the latex composition of the present invention. Dip molding means a method including dipping a mold in the latex composition to deposit the composition on the surface of the mold, then lifting the mold from the composition, and thereafter drying the composition deposited on the surface of the mold. Herein, the mold before dipping in the latex composition may be pre-heated. A coagulating agent can be, if necessary, used before the mold is dipped in the latex composition or after the mold is lifted from the latex composition.

Specific example of the method of using the coagulating agent preferably include a method including dipping the mold before dipping in the latex composition, in a solution of the coagulating agent, to attach the coagulating agent to the mold (anode coagulation dipping method) and a method including dipping the mold on which the latex composition is deposited, in a coagulating agent solution (Teague coagulation dipping method), and an anode coagulation dipping method is preferable from the viewpoint that a dip molded article small in thickness variation is obtained.

Specific examples of the coagulating agent include water-soluble polyvalent metal salts, for example, metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; and sulfates such as calcium sulfate, magnesium sulfate and aluminum sulfate. Among them, a calcium salt is preferable, and calcium nitrate is more preferable. Such water-soluble polyvalent metal salts can be used singly or in combinations of two or more kinds thereof.

The coagulating agent is preferably used in the form of an aqueous solution. The aqueous solution may further contain a water-soluble organic solvent such as methanol or ethanol, and/or a nonionic surfactant. The concentration of the coagulating agent varies depending on the type of the water-soluble polyvalent metal salt, and is preferably 5 to 50% by weight, more preferably 10 to 30% by weight.

After the mold is lifted from the latex composition, the deposit formed on the mold usually by heating is dried. The drying conditions way be appropriately selected.

Next, the deposit formed on the mold by heating is crosslinked.

While the heating conditions in crosslinking are not particularly limited, the heating temperature is preferably 60 to 150° C., more preferably 100 to 130° C., and the heating time is preferably 10 to 120 minutes.

Examples of the heating method include, but are not particularly limited, a method of heating by hot air in an oven and a method of heating by irradiation with infrared light.

In order to remove water-soluble impurities (for example, excessive surfactant and/or coagulating agent) before or after heating the mold on which the latex composition is deposited, the mold is preferably washed with water or warm water. The warm water used is preferably at 40° C. to 80° C., more preferably at 50° C. to 70° C.

The dip molded article after crosslinking is detached from the mold. Specific examples of the detaching method include a method for releasing the article from the mold by band and a method for releasing the article by water pressure or compressed air pressure. When the dip molded article during crosslinking has a sufficient strength for detaching, the dip molded article may be detached during crosslinking and continuously subsequently crosslinked.

The dip molded article of the present invention is obtained using the polymer latex of synthetic polyisoprene and/or a styrene-isoprene-styrene block copolymer, obtained by the production method of the present invention, and is thus excellent in tensile strength and can be particularly suitably used as a glove. When the dip molded article is a glove, an inorganic fine particle of talc, calcium carbonate or the like, or an organic fine particle such as a starch particle may be spread on the glove surface, an elastomer layer containing a fine particle may be formed on the glove surface, or the surface layer of the glove may be chlorinated, in order to prevent adhesion on the contact surface of the dip molded article to thereby enhance slipping during detachment.

The dip molded article of the present invention can also be used in, other than the glove, medical products such as a nipple for baby bottles, a dropper, a tube, a water cushion, a balloon sack, a catheter and a condom; toys such as an air ball, a doll and a ball; industrial products such as a bag for pressure molding and a bag for gas storage; and a fingerstall.

EXAMPLES

Hereinafter, the present invention will be more specifically described with reference to Examples and Comparative Examples, but the present invention is not intended to be limited to such Examples. Hereinafter, unless particularly noted, "part(s)" is on a weight basis, The test or evaluation methods of physical properties and characteristics are as follows.

Weight Average Molecular Weight (Mw) and Molecular Weight Distribution (Mw/Mn)

Dilution with tetrahydrofuran was made so that the solid content concentration of the synthetic polyisoprene or styrene-isoprene-styrene block copolymer included in the polymer solution was 0.1% by weight, and the solution was subjected to gel permeation chromatography analysis to calculate the weight average molecular weight (Mw) and the molecular weight distribution (Mw/Mn) in terms of standard polystyrene.

Solid Content Concentration at a Viscosity at a Temperature of 60° C. of 20,000 cps The solid content concentration of a polymer solution having a viscosity at a temperature of 60° C. of 20,000 cps, was determined according to the following method.

First, the polymer solution obtained was subjected to viscosity measurement according to the following method. Next, the amount of n-hexane, required so that the viscosity at a temperature of 60° C. of the polymer solution was 20,000 cps, was determined based on the solution viscosity measurement results obtained, and an operation where n-hexane was added to the polymer solution by such a determined amount and the viscosity measurement was again performed was repeated to thereby obtain a polymer solution having a viscosity at a temperature of 60° C. of 20,000 cps.

The solid content concentration of the resulting polymer solution having a viscosity at a temperature of 60° C. of 20,000 cps, was then measured according to the following method, thereby determining the solid content concentration at a viscosity at a temperature of 60° C. of 20,000 cps.

When the viscosity at a temperature of 60° C. of the polymer solution was below 20,000 cps, the operation was performed after the solvent was evaporated by an evaporator and the viscosity at a temperature of 60° C. was confirmed to be 20,000 cps or more.

Measurement of Viscosity of Polymer Solution

A B-type viscometer mold Model BH (manufactured by Tokyo Keiki Inc.) was used to perform measurement. Specifically, viscosity measurement was performed by placing 200 mL of the polymer solution in a 300-mL glass beaker, warming it to 60° C., and thereafter dipping any rotor of rotors Nos. 1 to 6 therein until the line stamped on the rotor reached the level of the polymer solution.

Solid Content Concentration in Polymer Solution

Two g of the polymer solution was accurately weighed (weight: X2) in an aluminum dish (weight: X1), and dried at 105° C. in an oven ("DK83", manufactured by YAMATO-SCALE) for 20 minutes. Next, the dried product was cooled in a desiccator and weighed together with the aluminum dish (weight: X3), and the solid content concentration in the polymer solution was calculated according to the following calculation expression.

$$\text{Solid content concentration (\% by weight)} = (X3-X1) \times 100/X2$$

Volume Average Particle Size of Polymer Latex

The volume average particle size of the particle included in the polymer latex was measured using a light scattering diffraction particle measurement apparatus ("LS-230", manufactured by Beckman Coulter, Inc.).

Tensile Strength pf Dip Molded Article

The tensile strength of the dip molded article was measured based on ASTM E412. Specifically, the dip molded article was subjected to punching by a dumbbell (Die-C) to produce a test piece for measurement, and the resulting test piece was pulled at a tensile rate of 500 mm/min by a Tensilon universal tester ("RTC-1225A" manufactured by ORIENTEC Co., LTD) to measure the tensile strength (unit: MPa) immediately before breakage.

Example 1

Production of Polymer Solution of Synthetic Polyisoprene

An autoclave equipped with a stirrer, dried and purged with nitrogen, was charged with 1150 parts of n-hexane and 100 parts of isoprene. The temperature in the autoclave was set to 60° C., and 0.1105 parts of a hexane solution containing 15% by weight of n-butyllithium, as a catalyst solution, was added with stirring to allow a reaction to run for 1 hour. The polymerization reaction rate was 99%. To the resulting reaction liquid was added 0.0831 parts of methanol as a polymerization terminator, to terminate the reaction, thereby obtaining polymer solution (A-1) of synthetic polyisoprene.

The synthetic polyisoprene included in polymer solution (A-1) obtained had a weight average molecular weight of 510,000 and a molecular weight distribution (Mw/Mn) of 2.0.

Concentration Adjustment Of Polymer Solution of Synthetic Polyisoprene

Polymer solution (A-1) of synthetic polyisoprene obtained above was subjected to concentration adjustment according to the above method so that the viscosity at a temperature of 60° C. was 20,000 cps, thereby obtaining polymer solution (B-1) of synthetic polyisoprene, having a viscosity at a temperature of 60° C. of 20,000 cps. Herein, the solid content concentration (synthetic polyisoprene content) in polymer solution (B-1) of synthetic polyisoprene was 28% by weight.

Emulsification Step

Ten parts of sodium rosinate and water were mixed to prepare an aqueous anionic surfactant solution having a sodium rosinate concentration of 1.5% by weight at a temperate re of 60° C. Polymer solution (B-1) of synthetic polyisoprene, having a viscosity at a temperature of 60° C. of 20,000 cps, and the aqueous anionic surfactant solution were then mixed by use of "Multi Line Mixer MS26-MMR-5.5L" (trade name) (manufactured by Satake Chemical Equipment Mfg., Ltd.) so that the weight ratio was 1:1.5, and subsequently mixed and emulsified at 4100 rpm by use of "Milder MDN310" (trade name) (manufactured by Pacific Machinery & Engineering CO., Ltd.), thereby obtaining emulsified liquid (C-1). Herein, the total feed flow rate of polymer solution (B-1) of synthetic polyisoprene and the aqueous anionic surfactant solution was 2,000 kg/hr, the temperature was 60° C., and the back pressure (gauge pressure) was 0.5 MPa.

Herein, the time until the maximum particle size of the particle contained in the emulsified liquid reached 32 μm was defined as an emulsification time t, and emulsification was performed based on the emulsification time t calculated. The maximum particle size was defined as the particle size at 0.05% from the higher frequency of the volume particle size in measurement of the particle size distribution with respect to the emulsified liquid by use of a light scattering diffraction particle measurement apparatus (("LS-230", manufactured by Beckman Coulter, Inc.). In Example 1, the emulsification time t was 43 minutes.

Next, emulsified liquid (C-1) obtained above was warmed to 80° C. under a reduced pressure of −0.01 to −0.09 MPa (gauge pressure), to distill off n-hexane. Here, "SM5515" (trade name) (produced by Dow Corning Toray Co., Ltd.) was used as a defoamer, and continuously added with spraying so that the amount thereof was 300 ppm by weight relative to the polyisoprene in the emulsified liquid. When n-hexane was here distilled off, the amount of emulsified liquid (C-1) was adjusted so as to be 70% by volute or less based on the tank volume, and a three-step inclined paddle blade was used as a stirring blade to slowly perform stirring at 60 rpm.

After distillation off of n-hexane was completed, emulsified liquid (C-1) from which n-hexane was distilled off was used to perform centrifugation at 4,000 to 5,000 G by use of a continuous centrifuge machine (trade name "SRG510", manufactured by ALFA LAVAL), thereby Obtaining latex (D-1) of synthetic polyisoprene, having a solid content concentration of 56% by weight, as a light liquid. Herein, the conditions for centrifugation were as follows: the solid content concentration of the emulsified liquid before centrifugation was 10% by weight, the flow rate in continuous centrifugation was 1300 kg/hr and the back pressure (gauge pressure) of the centrifuge machine was 1.5 MPa.

Latex (D-1) of synthetic polyisoprene obtained had a volume average particle size of 1.5 μm, a pH of 10, a viscosity of 210 mPa·s, as measured by a B-type viscometer, and a total anionic surfactant content per 100 parts of synthetic polyisoprene, of 2.0 parts. In addition, no aggregate was observed in latex (D-1) of synthetic polyisoprene.

Preparation of Latex Composition

While latex (D-1) of synthetic polyisoprene obtained above was stirred, dodecylbenzenesulfonic acid soda having a concentration of 10% by weight was added so that the amount thereof was 1 part in terms of the solid content based on 100 parts of the synthetic polyisoprene in the latex. While the resulting mixture was then stirred, 1.5 parts of zinc oxide, 1.5 parts of sulfur, 3 parts of an antioxidant (trade name Wingstay L, manufactured by Goodyear Tire and Rubber Company), 0.3 parts of zinc diethyldithiocarbamate, 0.5 parts of zinc dibutyldithiocarbamiate and 0.7 parts of a nercaptobenzothiazole zinc salt, in terms of the solid content based on 100 parts of the synthetic polyisoprene in the mixture, were added in the state of a water dispersion liquid and thereafter an aqueous potassium hydroxide solution was added thereto to adjust the pH to 10.5, thereby obtaining a latex composition.

Next, the resulting latex composition was aged in a constant temperature water bath adjusted at 30° C., for 48 hours.

Production of Dip Molded Article

A commercially available ceramic hand mold (manufactured by Shinko Ceramics Co,. Ltd.) was washed, pre-heated in an. oven at 70° C., thereafter dipped in an aqueous coagulating agent solution including 18% by weight of calcium nitrate and 0.05% by weight of polyoxyethylene lauryl ether (trade name "Emulgen 109P", produced by Kao Corporation) for 5 seconds, and taken out. Next, the hand mold covered with the coagulating agent was dried in an oven at 70° C. for 30 minutes or more.

Next, the hand mold covered with the coagulating agent was taken out from the oven, and dipped in the latex composition after aging, obtained above, for 10 seconds. Thereafter, the hand mold was air dried at room temperature for 10 minutes and then dipped in warm water at 60° C. for minutes, and thereafter the hand mold covered with film-shaped synthetic polyisoprene was placed in an oven at 130° C. and heated for 30 minutes to thereby perform crosslinking. Next, the hand mold covered with a film crosslinked was cooled to room temperature, thereafter talc was spread thereon, and then peeling off from the hand mold was made to thereby obtain a dip molded article (glove). The tensile strength of the resulting dip molded article (glove) was then measured according to the method. The results are shown in Table 1.

Example 2

Production of Polymer Solution of Synthetic Polyisoprene

The same manner as in Example 1 was performed except that the amount of the hexane solution containing 15% by weight of n-butyllithium, as a catalyst solution, and the amount of methanol as a polymerization terminator, in polymerization of isoprene, were changed to 0.1483 parts and 0.1112 parts, respectively, thereby obtaining polymer solution (A-2) of synthetic polyisoprene.

The synthetic polyisoprene included in polymer solution (A-2) obtained had a weight average molecular weight (Mw) of 380,000 and a molecular weight distribution (Mw/Mn) of 1.4.

Concentration Adjustment of Polymer Solution of Synthetic Polyisoprene

Polymer solution (A-2) of synthetic polyisoprene obtained above was subjected to concentration adjustment according to the above method so that the viscosity at a temperature of 60° C. was 20,000 cps, thereby obtaining polymer solution (B-2) of synthetic polyisoprene, having a viscosity at a temperature of 60° C. of 20,000 cps. Herein, the solid content concentration (synthetic polyisoprene content) in polymer solution (B-2) of synthetic polyisoprene was 34% by weight.

Emulsification Step

Next, the same manner as in Example 1 was performed except that polymer solution (B-2) of synthetic polyisoprene obtained, having a viscosity at a temperature of 60° C. of 20,000 cps, was used, thereby obtaining emulsified liquid (C-2). Also in Example 2, the time until the maximum particle size of the particle contained in the emulsified liquid reached 32 µm was defined as an emulsification time t, and emulsification was performed based on the emulsification time t calculated. In Example 2, the emulsification time t was 40 minutes.

Next, emulsified liquid (C-2) obtained was subjected to distillation off of n-hexane and centrifugation in the same manner as in Example 1, thereby obtaining latex (D-2) of synthetic polyisoprene. Latex (D-2) of synthetic polyisoprene obtained had a solid content concentration of 56% by weight, a pH of 10.1, a viscosity of 180 mPa·s, as measured by a B-type viscometer, and a total anionic surfactant content per 100 parts of synthetic polyisoprene, of 1.9 parts. In addition, no aggregate was observed in latex (D-2) of synthetic polyisoprene.

Preparation of Latex Composition and Production of Dip Molded Article

In addition, a latex composition and a dip molded article were obtained and evaluated in the same manner as in Example 1 except that latex (D-2) of synthetic polyisoprene obtained above was used. The results are shown in Table 1.

Example 3

Production of Polymer Solution of Synthetic Polyisoprene

The same manner as in Example 1 was performed except that the amount of the hexane solution containing 15% by weight of n-butyllithium, as a catalyst solution, and the amount of methanol as a polymerization terminator, in polymerization of isoprene, were changed to 0.0687 parts and 0.0515 parts, respectively, thereby obtaining polymer solution (A-3) of synthetic polyisoprene.

The synthetic polyisoprene included in polymer solution (A-3) obtained had a weight average molecular weight (Mw) of 820,000 and a molecular weight distribution (Mw/Mn) of 2.2.

Concentration Adjustment of Polymer Solution of Synthetic Polyisoprene

Polymer solution (A-3) of synthetic polyisoprene obtained above was subjected to concentration adjustment according to the above method so that the viscosity at a temperature of 60° C. was 20,000 cps, thereby obtaining polymer solution (B-3) of synthetic polyisoprene, having a viscosity at a temperature of 60° C. of 20,000 cps. Herein, the solid content concentration (synthetic polyisoprene content) in polymer solution (B-3) of synthetic polyisoprene was 19% by weight.

Emulsification Step

Next, the same manner as in Example 1 was performed except that polymer solution (B-3) of synthetic polyisoprene obtained, having a viscosity at a temperature of 60° C. of 20,000 cps, was used, thereby obtaining emulsified liquid (C-3). Also in Example 3, the time until the maximum particle size of the particle contained in the emulsified liquid reached 32 µm was defined as an emulsification time t, and emulsification was performed based on the emulsification time t calculated. In Example 3, the emulsification time t was 46 minutes.

Next, emulsified liquid (C-3) obtained as subjected to distillation off of n-hexane and centrifugation in the same manner as in Example 1, thereby obtaining latex (D-3) of synthetic polyisoprene. Latex (D-3) of synthetic polyisoprene obtained had a solid content concentration of 56% by weight, a pH of 10.1, a viscosity of 250 mPa·s, as measured by a B-type viscometer, and a total anionic surfactant content per 100 parts of synthetic polyisoprene, of 2.2 parts. In addition, no aggregate was observed in latex (D-3) of synthetic polyisoprene.

Preparation of Latex Cut Position and Production of Dip Molded Article

In addition, a latex composition and a dip molded article were obtained and evaluated in the same manner as in Example 1 except that latex (D-3) of synthetic polyisoprene obtained above was used. The results are shown in Table 1.

Example 4

Production of Polymer Solution of Styrene-Isoprene-Styrene Block Copolymer

An autoclave equipped with a stirrer, dried and purged with nitrogen, was charged with 300 parts of n-hexane, 15 parts of styrene and 0.0017 parts of N,N,N',N'-tetramethylethane-1,2-diamine. The temperature in the autoclave was set to 60° C., and 0.2036 parts of a hexane solution containing 15% by weight of n-butyllithium, as a catalyst solution, was added with stirring to allow a reaction to run for 20 minutes. Next, 85 parts of isoprene was continuously added into the autoclave for 1 hour. After such continuous addition, the reaction was allowed to run for 15 minutes. Next, 0.0308 parts of dimethyldichlorosilane was added to allow the reaction to run for 30 minutes. The polymerization reaction rate was 99%. To the resulting reaction liquid was added 0.0153 parts of methanol as a polymerization terminator, to terminate the reaction, thereby obtaining polymer solution (A-4) of styrene-isoprene-styrene block copolymer.

The styrene-isoprene-styrene block copolymer included in polymer solution (A-4) obtained had a weight average molecular weight (Mw) of 250,000 and a molecular weight distribution (Mw/Mn) of 1.1.

Concentration Adjustment of Polymer Solution of Styrene-Isoprene-Styrene Block Copolymer Polymer solution (A-4) of a styrene-isoprene-styrene block copolymer obtained above was subjected to concentration adjustment according to the above method so that the viscosity at a temperature of 60° C. was 20,000 cps, thereby obtaining polymer solution (B-4) of a styrene-isoprene-styrene block copolymer, having a viscosity at a temperature of 60° C. of 20,000 cps. Herein, the solid content concentration (styrene-isoprene-styrene block copolymer content) in polymer solution (B-4) of styrene-isoprene-styrene block copolymer was 52% by weight.

Emulsification Step

Next, the same manner as in Example 1 was performed except that polymer solution (B-4) of a styrene-isoprene-styrene block copolymer obtained, having a viscosity at a temperature of 60° C. of 20,000 cps, was used, thereby obtaining emulsified liquid (C-4). Also in Example 4, the time until the maximum particle size of the particle contained in the emulsified liquid reached 32 μm was defined as an emulsification time t, and emulsification was performed based on the emulsification time t calculated. In Example 4, the emulsification time t was 33 minutes.

Next, emulsified liquid (C-4) obtained was subjected to distillation off of n-hexane and centrifugation in the same manner as in Example 1, thereby obtaining latex (D-4) of styrene-isoprene-styrene block copolymer. Latex (D-4) of a styrene-isoprene-styrene block copolymer obtained had a solid content concentration of 56% by weight, a pH of 9.9, a viscosity of 140 mPa·s, as measured by a B-type viscometer, and a total anionic surfactant content per 100 parts of styrene-isoprene-styrene block polymer, of 1.9 parts. In addition, no aggregate was observed in latex (D-4) of styrene-isoprene-styrene block copolymer.

Preparation of Latex Composition and Production of Dip Molded Article

In addition, a latex composition and a dip molded article were obtained and evaluated in the same manner as in Example 1 except that latex (D-4) of a styrene-isoprene-styrene block copolymer obtained above was used. The results are shown in Table 1.

Comparative Example 1

Production of Polymer Solution of Synthetic Polyisoprene

The same manner as in Example 1 was performed except that the amount of the hexane solution containing 15% by weight of n-butyllithium, as a catalyst solution, and the amount of methanol as a polymerization terminator, in polymerization of isoprene, were changed to 0.2562 parts and 0.1920 parts, respectively, thereby obtaining polymer solution (A-5) of synthetic polyisoprene.

The synthetic polyisoprene included in polymer solution (A-5) obtained had a weight average molecular weight (Mw) of 220,000 and a molecular weight distribution (Mw/Mn) of 2.0.

Concentration Adjustment of Polymer Solution of Synthetic Polyisoprene

Polymer solution (A-5) of synthetic polyisoprene obtained above was subjected to concentration adjustment according to the above method so that the viscosity at a temperature of 60° C. was 20,000 cps, thereby obtaining polymer solution (B-5) of synthetic polyisoprene, having a viscosity at a temperature of 60° C. of 20,000 cps. Herein, the solid content concentration (synthetic polyisoprene content) in polymer solution (B-5) of synthetic polyisoprene was 62% by weight.

Emulsification Step

Next, the same manner as in Example 1 was performed except that polymer solution (B-5) of synthetic polyisoprene obtained, having a viscosity at a temperature of 60° C. of 20,000 cps, was used, thereby obtaining emulsified liquid (C-5). Also in Comparative Example 1, the time until the maximum particle size of the particle contained in the emulsified liquid reached 32 μm was defined as an emulsification time t, and emulsification was performed based on the emulsification time t calculated. In Comparative Example 1, the emulsification time t was 29 minutes.

Next, emulsified liquid (C-5) obtained was subjected to distillation off of n-hexane and centrifugation in the same manner as in Example 1, thereby obtaining latex (D-5) of synthetic polyisoprene. Latex (D-5) of synthetic polyisoprene obtained had a solid content concentration of 56% by weight, a pH of 10.1, a viscosity of 150 mPa·s, as measured by a B-type viscometer, and a total anionic surfactant content per 100 parts of synthetic polyisoprene, of 2.2 parts.

Preparation of Latex Composition and Production of Dip Molded Article

In addition, a latex composition and a dip molded article were obtained and evaluated in the same manner as in Example 1 except that latex (D-5) of synthetic polyisoprene Obtained above was used. The results are shown in Table 1. In Comparative Example 1, moldability was extremely inferior, and there could not be obtained any dip molded article whose tensile strength could be evaluated.

Comparative Example 2

Production of Polymer Solution of Synthetic Polyisoprene

The same manner as in Example 1 was performed except that the amount of the hexane solution containing 15% by weight of n-butyllithium, as a catalyst solution, and the amount of methanol as a polymerization terminator, in polymerization of isoprene, were changed to 0.0466 parts and 0.0349 parts, respectively, thereby obtaining polymer solution (A-6) of synthetic polyisoprene.

The synthetic polyisoprene included in polymer solution (A-6) obtained had a weight average molecular weight (Mw) of 1,210,000 and a molecular weight distribution (Mw/Mn) of 2.0.

Concentration Adjustment of Polymer Solution of Synthetic Polyisoprene

Polymer solution (A-6) of synthetic polyisoprene obtained above was subjected to concentration adjustment according to the above method so that the viscosity at a temperature of 60° C. was 20,000 cps, thereby obtaining polymer solution (B-6) of synthetic polyisoprene, having a viscosity at a temperature of 60° C. of 20,000 cps. Herein, the solid content concentration (synthetic polyisoprene content) in polymer solution (B-6) of synthetic polyisoprene was 8% by weight.

Emulsification Step

Next, the same manner as in Example 1 was performed except that polymer solution (B-6) of synthetic polyisoprene obtained, having a viscosity at a temperature of 60° C. of 20,000 cps, was used, thereby obtaining emulsified liquid (C-6). Also in Comparative Example 2, the time until the maximum particle size of the particle contained in the emulsified liquid reached 32 μm was defined as an emulsification time t, and emulsification was performed based on the emulsification time t calculated. In Comparative Example 2, the emulsification time t was 50 minutes.

Next, emulsified liquid (C-6) obtained was subjected to distillation off of n-hexane and centrifugation in the same manner as in Example 1, thereby obtaining latex (D-6) of synthetic polyisoprene. Latex (D-6) of synthetic polyisoprene obtained had a solid content concentration of 56% by weight, a pH of 10, a viscosity of 400 mPa·s, as measured by a B-type viscometer, and a total anionic surfactant content per 100 parts of synthetic polyisoprene, of 1.9 parts.

Preparation of Latex Composition and Production of Dip Molded Article

In addition, a latex composition and a dip molded article were obtained and evaluated in the same manner as in Example 1 except that latex (D-6) of synthetic polyisoprene obtained above was used. The results are shown in Table 1.

Comparative Example 3

Production, Coagulation and Re-Dissolution of Polymer Solution of Synthetic Polyisoprene The same manner as in Example 1 was performed except that the amount of the hexane solution containing 15% by weight of n-butyllithium, as a catalyst solution, and the amount of methanol as a polymerization terminator, in polymerization of isoprene, were changed to 0.0376 parts and 0.0282 parts, respectively, thereby obtaining polymer solution (A-7) of synthetic polyisoprene.

Polymer solution (A-7) obtained was subjected to coagulation with steam, and the resulting coagulated product was dried in a condition of 150° C. to 200° C., thereby obtaining solid synthetic polyisoprene (E-7).

Synthetic polyisoprene (E-7) obtained was then mixed with n-hexane, and dissolved under stirring with the temperature being raised to 60° C., thereby preparing n-hexane solution (F-7) of synthetic polyisoprene.

The synthetic polyisoprene included in n-hexane solution (F-7) obtained had a weight average molecular weight (MW) of 1,500,000 and a molecular weight distribution (Mw/Mn) of 3.2.

Concentration Adjustment of Polymer Solution of Synthetic Polyisoprene n-Hexane solution (F-7) of synthetic polyisoprene obtained above was subjected to concentration adjustment according to the above method so that the viscosity at a temperature of 60° C. was 20,000 cps, thereby obtaining n-hexane solution (G-7) of synthetic polyisoprene, having a viscosity at a temperature of 60° C. of 20,000 cps. Herein, the solid content concentration (synthetic polyisoprene content) in n-hexane solution (G-7) of synthetic polyisoprene was 6% by weight.

Emulsification Step

Next, the same manner as in Example 1 was performed except that n-hexane solution (G-7) of synthetic polyisoprene obtained, having a viscosity at a temperature of 60° C. of 20,000 cps, was used, thereby obtaining emulsified liquid (C-7). Also in Comparative Example 3, the time until the maximum particle size of the particle contained in the emulsified liquid reached 32 μm was defined as an emulsification time t, and emulsification was performed based on the emulsification time t calculated. In Comparative Example 3, the emulsification time t was 51 minutes.

Next, emulsified liquid (C-7) obtained was subjected to distillation off of n-hexane and centrifugation in the same manner as in Example 1, thereby obtaining latex (D-7) of synthetic polyisoprene. Latex (D-7) of synthetic polyisoprene obtained had a solid content concentration of 56% by weight, a pH of 10.2, a viscosity of 440 mPa·s, as measured by a B-type viscometer, and a total anionic surfactant content per 100 parts of synthetic polyisoprene, of 2.0 parts.

Preparation of Latex Composition and Production of Dip Molded Article

In addition, a latex composition and a dip molded article were obtained and evaluated in the same manner as in Example 1 except that latex (D-7) of synthetic polyisoprene Obtained alcove was used. The results are shown in Table 1.

TABLE 1

| | Production method[1] | Type of polymer | Polymer solution after polymerization Solid content concentration (% by weight) at viscosity at temperature of 60° C. of 20,000 cps | Mw/Mn of polymer | Polymer latex Productivity[2] (kg/hr) | Dip molded article Tensile strength (MPa) |
|---|---|---|---|---|---|---|
| Example 1 | Direct emulsification | Synthetic polyisoprene | 28 | 2.0 | 777 | 22 |
| Example 2 | Direct emulsification | Synthetic polyisoprene | 34 | 1.4 | 1000 | 19 |
| Example 3 | Direct emulsification | Synthetic polyisoprene | 19 | 2.2 | 486 | 24 |
| Example 4 | Direct emulsification | SIS | 52 | 1.1 | 1865 | 26 |
| Comparative Example 1 | Direct emulsification | Synthetic polyisoprene | 62 | 2.0 | 2533 | Unmeasurable |
| Comparative Example 2 | Direct emulsification | Synthetic polyisoprene | 8 | 2.0 | 187 | 28 |
| Comparative Example 2 | Emulsification after dissolution | Synthetic polyisoprene | 6 | 3.2 | — | 18 |

[1]In Table 1, "Direct emulsification" means production by direct emulsifying each polymer solution obtained by solution polymerization of each monomer, without coagulation. In addition, "Emulsification after dissolution" means production by once coagulating and drying each polymer solution obtained by solution polymerization of each monomer, and again dissolving the resulting solid in an organic solvent and thereafter emulsifying the resulting solution.
[2]The productivity of each polymer latex was determined as follows: a production rate under the assumption that the production rate (the amount of production per unit time) in Example 2 was 1,000 kg/hr was calculated based on the emulsification time t and the solid content concentration of the polymer solution determined in each of Examples 1 to 4 and Comparative Examples 1 to 3 and such a production rate was expressed as the productivity.

From Table 1, when the synthetic polyisoprene and/or the styrene-isoprene-styrene block copolymer included in the polymer solution were/was synthetic polyisoprene and/or a styrene-isoprene-styrene block copolymer which, when formed into a polymer solution having a molecular weight distribution of 1.0 to 2.6 and a viscosity at a temperature of 60° C. of 20,000 cps, had a solid content concentration in the range of 10 to 60% by weight, and such synthetic polyisoprene and/or a styrene-isoprene-styrene block copolymer were/was emulsified in water in the presence of a surfactant, not only the productivity of each polymer latex was high (the production rate was high), but also a dip molded article high in tensile strength was provided (Examples 1 to 4).

On the other hand, when the synthetic polyisoprene and/or the styrene-isoprene-styrene block copolymer included in the polymer solution were/was synthetic polyisoprene and/or a styrene-isoprene-styrene block copolymer which, when formed into a polymer solution having a viscosity at a temperature of 60° C. of 20,000 cps, had a solid content concentration of more than 60% by weight, the resulting latex composition was extremely inferior in moldability, and there could not be obtained any dip molded article whose tensile strength could be evaluated (Comparative Example 1).

In addition, when the synthetic polyisoprene and/or the styrene-isoprene-styrene block copolymer included in the polymer solution were/was synthetic polyisoprene and/or a styrene-isoprene-styrene block copolymer which, when formed into a polymer solution having a viscosity at a temperature of 60° C. of 20,000 cps, had a solid content concentration of less than 10% by weight, the productivity of the polymer latex was inferior (the production rate was low) (Comparative Example 2).

Furthermore, when the synthetic polyisoprene and/or the styrene-isoprene-styrene block polymer included in the polymer solution were/was synthetic polyisoprene and/or a styrene-isoprene-styrene block copolymer having a molecular weight distribution of more than 2.6, the resulting dip molded article was inferior in tensile strength (Comparative Example 3).

The invention claimed is:

1. A method for producing a polymer latex, comprising a polymerization step of polymerizing a monomer in an organic solvent to thereby obtain a polymer solution of synthetic polyisoprene and/or a styrene-isoprene-styrene block copolymer, and an emulsification step of emulsifying a polymer solution obtained by dissolution of synthetic polyisoprene and/or a styrene-isoprene-styrene block copolymer having a molecular weight distribution of 1.0 to 2.6 in an organic solvent, in water in the presence of a surfactant, to thereby obtain an emulsified liquid, wherein
   the polymer solution obtained in the polymerization step is used without coagulation as the polymer solution in the emulsification step, and
   as the synthetic polyisoprene and/or styrene-isoprene-styrene block copolymer, used are/is synthetic polyisoprene and/or a styrene-isoprene-styrene block copolymer which, when dissolved in an organic solvent to thereby be formed into a polymer solution having a viscosity at a temperature of 60° C. of 20,000 cps, have/has a solid content concentration in the range of 10 to 60% by weight.

2. The method for producing a polymer latex according to claim 1, wherein as the synthetic polyisoprene and/or styrene-isoprene-styrene block copolymer, used are/is synthetic polyisoprene and/or a styrene-isoprene-styrene block copolymer which, when dissolved in n-hexane to thereby be formed into a polymer solution having a viscosity at a temperature of 60° C. of 20,000 cps, have/has a solid content concentration in the range of 10 to 60% by weight.

3. The method for producing a polymer latex according to claim 1, wherein polymerization of the monomer is performed using an alkyllithium polymerization catalyst.

4. The method for producing a polymer latex according to claim 1, further comprising:
   a solvent removal step of removing the organic solvent in the emulsified liquid; and
   a centrifugation step of centrifuging the emulsified liquid from which the organic solvent is removed, to thereby concentrate the emulsified liquid.

5. The method for producing a polymer latex according to claim 1, wherein the surfactant is sodium rosinate and/or potassium rosinate.

6. A method for producing a latex composition, comprising a step of adding a crosslinking agent to a polymer latex obtained by the method according to claim 1.

7. A method for producing a dip molded article, comprising a step of dip molding a latex composition obtained by the method according to claim 6.

* * * * *